(12) United States Patent
Yoshida

(10) Patent No.: US 9,825,438 B2
(45) Date of Patent: Nov. 21, 2017

(54) SWITCHGEAR

(71) Applicant: MITSUBISHI ELECTRIC CORPORATION, Chiyoda-ku, Tokyo (JP)

(72) Inventor: Tadahiro Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/303,935

(22) PCT Filed: Jun. 6, 2014

(86) PCT No.: PCT/JP2014/065074
§ 371 (c)(1),
(2) Date: Oct. 13, 2016

(87) PCT Pub. No.: WO2015/186244
PCT Pub. Date: Dec. 10, 2015

(65) Prior Publication Data
US 2017/0040779 A1 Feb. 9, 2017

(51) Int. Cl.
*H02B 13/00* (2006.01)
*H02B 1/56* (2006.01)
(Continued)

(52) U.S. Cl.
CPC .......... *H02B 1/565* (2013.01); *H02B 1/308* (2013.01); *H02B 13/005* (2013.01); *H02B 13/025* (2013.01); *H02B 13/0358* (2013.01)

(58) Field of Classification Search
None
See application file for complete search history.

(56) References Cited

U.S. PATENT DOCUMENTS

| 7,054,143 B2 * | 5/2006 | Eiselt | H02B 13/025 218/155 |
| 7,688,595 B2 * | 3/2010 | Garmong | H05K 9/0001 361/752 |

(Continued)

FOREIGN PATENT DOCUMENTS

| AU | 2013201083 A1 | 9/2013 |
| JP | H-3-66512 U | 6/1991 |

(Continued)

OTHER PUBLICATIONS

International Search Report (PCT/ISA/210) dated Jul. 15, 2014, by the Japanese Patent Office as the International Searching Authority for International Application No. PCT/JP2014/065074.

*Primary Examiner* — Courtney Smith
(74) *Attorney, Agent, or Firm* — Buchanan Ingersoll & Rooney PC

(57) ABSTRACT

Switchgear includes a duct by which inside portions of a plurality of cable compartments are linked each other; and a gas flow direction restriction device by which high-pressure gas is flowed only in a predetermined direction in the duct when the high-pressure gas is generated at the inside of any of the cable compartments in the plurality of cable compartments; in which the high-pressure gas can be ejected from a predetermined portion of the switchgear to the outside without increasing outer dimensions of the switchgear in accordance with an internal fault in the cable compartments.

8 Claims, 3 Drawing Sheets

(51) Int. Cl.
    *H02B 1/30*     (2006.01)
    *H02B 13/025*     (2006.01)
    *H02B 13/035*     (2006.01)

(56) References Cited

U.S. PATENT DOCUMENTS

| | | | |
|---|---|---|---|
| 9,297,362 B2 * | 3/2016 | Becker | F03D 11/00 |
| 2009/0200273 A1 * | 8/2009 | Josten | H02B 13/025 218/157 |
| 2011/0299228 A1 * | 12/2011 | Milovac | H02B 11/26 361/614 |
| 2015/0340174 A1 * | 11/2015 | Yoshida | H02B 13/0352 361/618 |
| 2016/0156163 A1 * | 6/2016 | Faber | H02B 13/025 361/605 |

FOREIGN PATENT DOCUMENTS

| | | |
|---|---|---|
| JP | 2007-221878 A | 8/2007 |
| JP | 2011-223721 A | 11/2011 |
| WO | WO 2012/124195 A1 | 9/2012 |

* cited by examiner

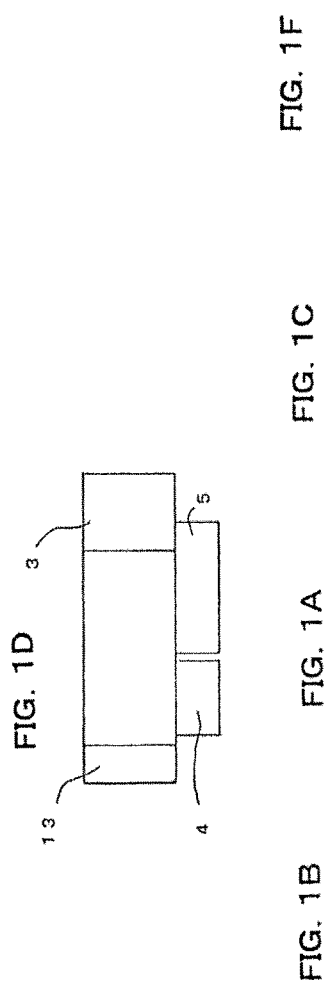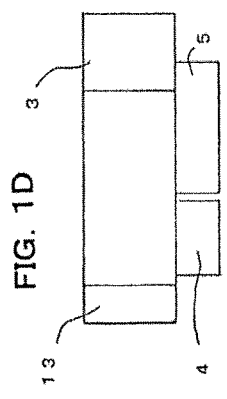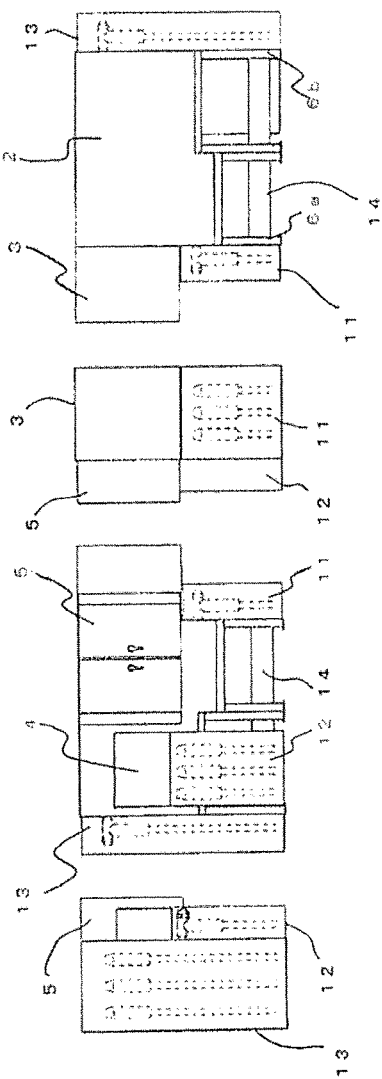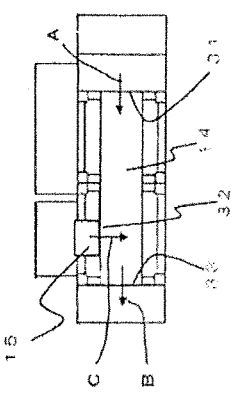

SWITCHGEAR

BACKGROUND OF THE INVENTION

Technical Field

The present invention relates to switchgear which is used for an electric power delivering and transforming facility.

Background Art

In a usual switchgear device, a bus bar which is connected to an electric power source at the outside, a cable which is connected to a load, a switchgear main body, which is a switching device, such as a switching unit, which is connected between the bus bar and the cable, are installed in compartments which are separated each other. In the switchgear which is configured as described above, in order to safely eject hot gas, which is generated when an internal fault of the switchgear is caused, in a predetermined direction, there is a conventional device which adopts a compartment in which the bus bar, the cable, and the switchgear main body are installed, and adopts a method in which a hot gas ejection means, in other words, an ejection passage and an ejection structure are arranged at the other compartment, and the hot gas, which is generated when an internal fault of the switchgear is caused, is intentionally flowed to an adjacent compartment, and or to a compartment of the other adjacent switchgear by the hot gas ejection means (for example, refer to Patent Document 1).

CONVENTIONAL ART DOCUMENT

Patent Document

Patent Document 1: Australia Patent Application No. AU2013201083A1

SUMMARY OF THE INVENTION

Problems to be Solved by the Invention

In a case of the conventional switchgear which is described above, a plurality of cable compartments, in which a cable is installed, are arranged, in one switchgear, at separated positions which are front positions or rear positions of a high-voltage compartment in which a switching device is installed, and when an adjacent cable compartment is not provided, there has been problems in that a means, which ejects the hot gas, which is the high-pressure gas which is generated in any of the cable compartments, to the outside, must be provided at the outside of the cable compartments, and outer dimensions of the switchgear is increased.

The present invention has been made to solve the above-described problems in the conventional switchgear, and an object of the invention is to provide switchgear which can be corresponding to an internal fault in the cable compartments without increasing the outer dimensions of the switchgear.

Means for Solving Problems

Switchgear of the present invention includes a high-voltage compartment which installs at least a switching device and a conductor, which is connected to the switching device, in a sealed case in which insulation gas is encapsulated; an operation mechanism compartment which installs an operation mechanism for operating the switching device; a control box which installs a control instrument for controlling the switching device; a base frame which supports the high-voltage compartment; and a plurality of cable compartments which respectively install a high voltage cable which is connected to the conductor, and are separated each other so as to be arranged; wherein a duct, by which inside portions of the plurality of cable compartments are linked each other, is provided; and a gas flow direction restriction device, by which high-pressure gas is flowed only in a predetermined direction in the duct when the high-pressure gas is generated at the inside of any of the cable compartments in the plurality of cable compartments, is provided.

Effects of the Invention

According to the switchgear of the present invention, a duct, by which inside portions of a plurality of cable compartments are linked each other, and a gas flow direction restriction device, by which high-pressure gas is flowed only in a predetermined direction in the duct when the high-pressure gas is generated at the inside of any of the cable compartments in the plurality of cable compartments, are provided, so that the switchgear can be corresponding to an internal fault with respect to the plurality of cable compartments without increasing the outer dimensions of the switchgear.

BRIEF DESCRIPTION OF THE DRAWINGS

FIGS. 1A through 1F are six-surface views illustrating switchgear according to Embodiment 1 of the present invention,
and FIG. 1A illustrates a front surface,
and
FIG. 1B illustrates a left side surface,
and
FIG. 1C illustrates a right side surface,
and
FIG. 1D illustrates a top surface,
and FIG. 1E illustrates a bottom surface,
and FIG. 1F illustrates a rear surface.

MODE FOR CARRYING OUT THE INVENTION

Embodiment 1

Figure 2:
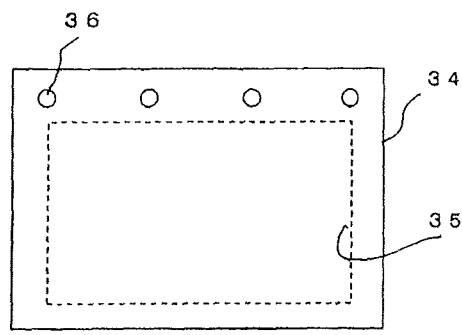
FIG. 2 is a plane view illustrating an arc check plate of the switchgear according to Embodiment 1 of the present invention.

Hereinafter, switchgear according to Embodiment 1 of the present will be minutely explained in reference to the drawings. FIGS. 1A through 1F are six-surface views illustrating the switchgear according to Embodiment 1 of the present invention, and FIG. 1A illustrates a front surface, and FIG. 1B illustrates a left side surface, and FIG. 1C illustrates a right side surface, and FIG. 1D illustrates a top surface, and FIG. 1E illustrates a bottom surface, and FIG. 1F illustrates a rear surface. Switchgear 100, which is illustrated in FIGS. 1A through 1F, include a high-voltage compartment 2, a first operation mechanism compartment 3, a second operation mechanism compartment 4, a control compartment 5, a base frame 6a, a base frame 6b, a first cable compartment 11, a second cable compartment 12, and a third cable compartment 13.

The high-voltage compartment 2 is composed of a sealed vessel in which insulation gas is encapsulated, and the high-voltage compartment 2 installs a switchgear main circuit (not illustrated), which is a switching device, such as a circuit breaker or a disconnecting switch, a conductor (not illustrated) which constructs the switchgear main circuit, and a bushing. The bushing, which is installed in the high-voltage compartment 2, is connected to a cable which penetrates the high-voltage compartment 2 and is connected the conductor in the high-voltage compartment 2.

The first operation mechanism compartment 3 and the second operation mechanism compartment 4 install an operation mechanism for operating the switchgear main circuit which is installed in the high-voltage compartment 2. The control compartment 5 installs a set of control instruments for controlling an operation mechanism and the like, which are installed in the first operation mechanism compartment 3 and the second operation mechanism compartment 4. The base frame 6a and the base frame 6b support the high-voltage compartment 2. The first cable compartment 11, the second cable compartment 12, and third cable compartment 13 are respectively provided in such a way that the compartments cover a cable connection bushing and a cable.

The first cable compartment 11 is arranged at one side surface of the high-voltage compartment 2. The second cable compartment 12 is arranged at a front surface of the high-voltage compartment 2. The third cable compartment 13 is arranged at the other side surface of the high-voltage compartment 2, and is configured in such a way that the third cable compartment 13 is extended, at the other side surface of the high-voltage compartment 2, from a bottom portion to a top surface of the switchgear 100.

One end portion of a first duct 14 is connected to the first cable compartment 11 via a connecting portion 31, and the other end portion of the first duct 14 is connected to the third cable compartment 13 via a connecting portion 33. One end portion of a second duct 15 is connected to the second cable compartment 12 via a connecting portion 34, and the other end portion of the second duct 15 is connected to the first duct 14 via a connecting portion 32. The first duct 14 and the second duct 15 are arranged at a lower position of the high-voltage compartment 2, and are arranged at a position in a state where the ducts don't interfere with the base frame 6a and the base frame 6b, and the ducts are configured in such a way that a large cross-sectional area can be secured within a possible area in order to suppress an pressure increase which is caused by hot gas.

An arc check plate, which is described in the following description, by which the hot gas can be leaked in an allow "A" direction, and the hot gas cannot be leaked in the reverse direction, is arranged at the connecting portion 31 of the one end portion of the first duct 14 and the first cable compartment 11. Moreover, an arc check plate, which is described in the following description, by which the hot gas can be leaked in an allow "B" direction, and the hot gas cannot be leaked in the reverse direction, is arranged at the connecting portion 33 of the other end portion of the first duct 14 and the third cable compartment 13. Furthermore, an arc check plate, which is described in the following description, by which the hot gas can be leaked in an allow "C" direction, and the hot gas cannot be leaked in the reverse direction, is arranged at the connecting portion 32 of the first duct 14 and the second duct 15.

FIG. 2 is a plane view illustrating an arc check plate of the switchgear according to Embodiment 1 of the present invention. In FIG. 2, an arc check plate 34 is configured by using a plane plate, which is made of iron, stainless steel, or aluminum, and is formed in a state where the arc check plate 34 is larger than a connecting hole 35 in such a way that the arc check plate 34 blocks the connecting hole 35 which is positioned at the connecting portion 31 of the one end portion of the first duct 14 and the first cable compartment 11. Moreover, one side of the arc check plate 34, which is faced to a part of a circumference of the connecting hole 35, is fixed to a part of the circumference of the connecting hole 35 by a bolt 36 in such a way that the arc check plate 34 is contacted from a first duct 14 side to the circumference of the connecting hole 35 so as to block the connecting hole 35. As a result, the connecting hole 35 is opened in such a way that the arc check plate 34 is bent in a direction of the first duct 14 and the arc check plate 34 is separated from the circumference of the connecting hole 35, whereby the hot gas, which is generated in the first cable compartment 11, can be leaked toward the first duct 14 side in the allow "A" direction which is indicated in FIGS. 1A through 1F. However, the arc check plate 34 cannot be bent in a reverse direction of the allow "A" direction, in which the arc check plate 34 is contacted to the circumference of the connecting hole 35, so that the connecting hole 35 cannot be opened even when the hot gas exists at the first duct 14 side, and the hot gas cannot be leaked from the first duct 14 side to the first cable compartment 11 side.

In a similar way, the arc check plate 34 is formed in a state where the plate 34 is larger than the connecting hole 35 in such a way that the arc check plate 34 blocks the connecting hole 35 which is positioned at the connecting portion 33 of the other end portion of the first duct 14 and the third cable compartment 13. Moreover, one side of the arc check plate 34, which is faced to a part of a circumference of the connecting hole 35 of the connecting portion 33, is fixed to a part of the circumference of the connecting hole 35 by a bolt 36, a bolt 37, a bolt 38, and a bolt 39 in such a way that the arc check plate 34 blocks the connecting hole 35 from the third cable compartment 13 side.

As a result, the hot gas, which is generated in the third cable compartment 13, cannot bend the arc check plate 34 in a direction of the first duct 14, so that it is prevented that the hot gas is leaked to the first duct 14 side, whereby the hot gas is ejected from an ejection portion (not illustrated), which is provided at an upper portion of the third cable compartment 13, to the outside of the switchgear 100. Moreover, the hot gas, which is generated in the first cable compartment 11, bends the arc check plate 34 as described above, and the hot gas is leaked into the first duct 14 in the allow "A" direction indicated in FIGS. 1A through 1F, and moreover, the hot gas bends the arc check plate 34, which is provided at the connecting portion 33, toward the third cable compartment 13 side, and is leaked into the third cable compartment 13 in the allow "B" direction indicated in FIGS. 1A through 1F. Lastly, the hot gas is ejected from the ejection portion, which is provided at the upper portion of the third cable compartment 13, to the outside of the switchgear 100.

Moreover, the arc check plate 34 is configured in a state where the plate 34 is larger than the connecting hole 35 in such a way that the arc check plate 34 blocks the connecting hole 35, which is positioned at the connecting portion 32 of the first duct 14 and the second duct 15. Moreover, one side of the arc check plate 34, which is faced to a part of a circumference of the connecting hole 35 of the connecting portion 32, is fixed to a part of the circumference of the connecting hole 35 by a bolt 36 in such a way that the arc check plate 34 blocks the connecting hole 35 from the second duct 15 side.

As a result, the hot gas, which is generated in the second cable compartment 12, bends the arc check plate 34 via the second duct 15 as described above, and is leaked into the first duct 14 in the allow "C" direction indicated in FIGS. 1A through 1F, and moreover, the hot gas bends the arc check plate 34, which is provided at the connecting portion 33, toward the third cable compartment 13 side, and is leaked into the third cable compartment 13 in the allow "C" direction indicated in FIGS. 1A through 1F. Lastly, the hot gas is ejected from the ejection portion, which is provided at the upper portion of the third cable compartment 13, to the outside of the switchgear 100.

As described above, even when the cable compartments are provided in such a way that a plurality of the first cable compartment 11, the second cable compartment 12, and the third cable compartment 13 are divided, it is required that the hot gas, which is generated in each of the cable compartments, is ejected toward an upper surface of the switchgear 100. However, as indicated in FIGS. 1A through 1F, the first operation mechanism compartment 3 and the second operation mechanism compartment 4 are provided at upper portions of the first cable compartment 11 and the second cable compartment 12, so that it is required that the hot gas is ejected in an upper direction of the switchgear 100 in a state where the hot gas avoids the first operation mechanism compartment 3 and the second operation mechanism compartment 4. Although it is considered that there is one countermeasure in which ejection portions for the hot gas are respectively provided at a side surface of the first cable compartment 11 and a side surface of the second cable compartment 12, there has been a problem in this case in which the outer dimensions of the switchgear 100 are increased.

In the switchgear 100 according to Embodiment 1 of the present invention, it is used that the third cable compartment 13 is extended to an upper surface of the switchgear 100, and the hot gas is lastly ejected from the upper surface of the third cable compartment 13, and in the particular configuration of the switchgear 100, the first duct 14 and second duct 15 are arranged, and the arc check plate 34 is arranged at each of the connecting portion 31, the connecting portion 32, and the connecting portion 33. Thereby, the hot gas, which is generated in the first cable compartment 11 or the second cable compartment 12, can be ejected from the upper surface of the switchgear 100 via the third cable compartment 13.

In addition, although the above description indicates a case in which one side of the arc check plate 34 is fixed by the bolts 36 at four positions adjacent to the connecting hole 35, the number of the bolts is not limited to four. In other words, it is suitable that the arc check plate 34 is fixed in such a way that when a pressure of the hot gas is operated in a direction where the arc check plate 34 is contacted to the circumference of the connecting hole 35, the arc check plate 34 blocks the connecting hole 35, whereby the hot gas is not ejected to the outside of the connecting hole 35, and when the pressure of the hot gas is operated in a direction where the arc check plate 34 is separated from the circumference of the connecting hole 35, the connecting hole 35 is opened in such a way that the arc check plate 34 is bent and modified around a fixing position of the arc check plate 34, whereby the hot gas can be ejected to the outside of the connecting hole 35.

As described above, in the switchgear 100 according to Embodiment 1 of the present invention, a configuration, in which a plurality of cable compartments are connected by using the ducts, is adopted, whereby an ejection function of all cable compartments can be maintained without increasing the outer dimensions of the switchgear 100, and the AFLR class (configuration in which hot gas is not ejected to the other surface of upper and lower surfaces of switchgear), which is defined in the IEC standard (IEC 62271-200), can be realized.

Embodiment 2

Figure 3A:
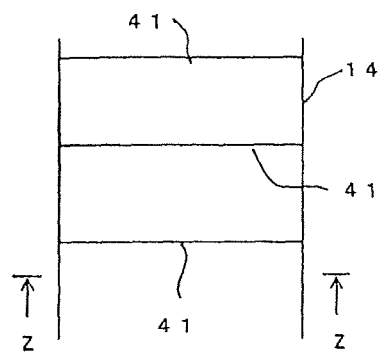
FIG. 3A is a cross-sectional view illustrating a duct of switchgear according to Embodiment 2 of the present invention in a state where the duct is cut in an extension direction of the duct.

Hereinafter, switchgear according to Embodiment 2 of the present will be explained. FIG. 3A is a cross-sectional view illustrating a duct of the switchgear according to Embodiment 2 of the present invention in a state where the duct is cut in an extension direction of the duct. A first duct 14, which is illustrated in FIG. 3A, is corresponding to the first duct 14 according to Embodiment 1, and is illustrated in a state where an upper-lower direction in FIG. 3A is defined as a longitudinal direction. In FIG. 3A, the first duct 14 has a configuration in which three shield plates 41 are arranged via a predetermined interval in a vertical direction with respect to a longitudinal direction of the first duct 14, in other words, in a vertical direction with respect to a direction where hot gas is flowed, in such a way that a flow of the hot gas is partly blocked. A hole 42 is provided at the shield plates 41 in such a way that the hot gas is partly passed through.

Figure 3B:
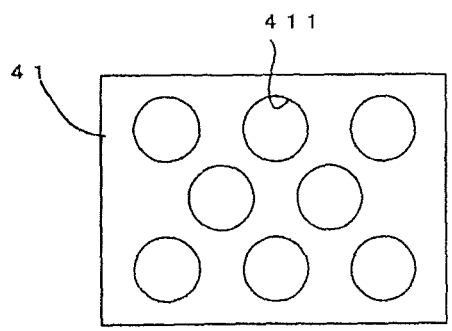
FIG. 3B is a plane view illustrating shield plates of the switchgear according to Embodiment 2 of the present invention.

FIG. 3B is a plane view illustrating the shield plates of the switchgear according to Embodiment 2 of the present invention, and FIG. 3B is the plane view in which the shield plates 41, which are illustrated in FIG. 3A, are viewed from an arrow "Z" direction indicated in FIG. 3A. In FIG. 3B, the shield plates 41 include a plurality of through holes 411 in such a way that the hot gas is partly flowed. The shapes, the arrangement positions, and the number of the through holes 411 can be varied in accordance a flow rate of the hot gas, which is estimated, a pressure value, which is increased, or the like. Moreover, the number of the shield plates 41 is not limited to three, and the number of the shield plates 41 can be varied in accordance with the flow rate of the hot gas, which is estimated, the pressure value, which is increased, or the like. Moreover, it is suitable that the shapes, the arrangement positions, and the number of the through holes 411 are varied in accordance with the number of the shield plates 41. Moreover, it is suitable that the shield plates 41 are provided at the above-described second duct 15 according to Embodiment 1.

The other configuration of the switchgear 100 according to Embodiment 2 is similar to the configuration of the switchgear 100 according to Embodiment 1.

As described above, the shield plates 41 are provided in the first duct 14, whereby a temperature of the hot gas, which is passed through the first duct 14, can be decreased, and a blowoff pressure can be decreased. Thereby, the reinforcements, by which a strength of a third cable compartment 13, which is connected to the first duct 14, is maintained, can be reduced, so that a cost of the third cable compartment 13 can be lastly reduced.

A configuration, in which a plurality of cable compartments are connected by using the ducts, is adopted in the switchgear 100 according to Embodiment 2 of the present invention, whereby an ejection function of all cable compartments can be maintained without increasing the outer dimensions of the switchgear 100, and the AFLR class (configuration in which hot gas is not ejected to the other surface of upper and lower surfaces of switchgear), which is defined in the IEC standard (IEC 62271-200), can be realized.

Embodiment 3

Figure 4:
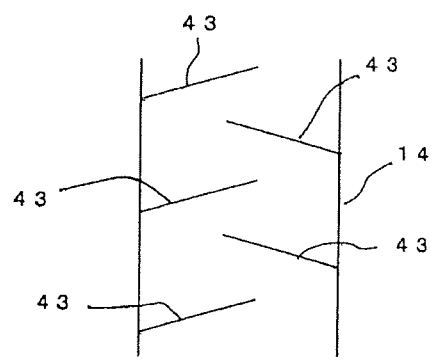
FIG. 4 is a cross-sectional view illustrating a duct of switchgear according to Embodiment 3 of the present invention in a state where the duct is cut in an extension direction of the duct.

Hereinafter, switchgear according to Embodiment 3 of the present will be explained. FIG. 4 is a cross-sectional view illustrating a duct of the switchgear according to Embodiment 3 of the present invention in a state where the duct is cut in an extension direction of the duct. A first duct 14, which is illustrated in FIG. 4, is corresponding to the first duct 14 according to Embodiment 1, and is illustrated in a state where an upper-lower direction in FIG. 4 is defined as a longitudinal direction. In FIG. 4, the first duct 14 has a configuration in which five shield plates 43 are alternately fixed to one side surface and the other side surface of the first duct 14 and are arranged via a predetermined interval in a slanting direction with respect to a vertical direction with respect to a longitudinal direction of the first duct 14, in other words, in a slanting direction with respect to a vertical direction with respect to a direction where hot gas is flowed, in such a way that a flow of the hot gas is blocked. An inclination direction of each of the shield plates 43 is a direction in which the hot gas is flowed. In addition, the number of the shield plates 43 can be varied in accordance with a flow rate of the hot gas, which is estimated, a pressure value, which is increased, or the like. Moreover, it is suitable that the shield plates 43 are provided at the above-described second duct 15 according to Embodiment 1.

The other configuration of the switchgear 100 according to Embodiment 3 is similar to the configuration of the switchgear 100 according to Embodiment 1.

As described above, a temperature of the hot gas, which is passed through the first duct 14, can be decreased, and a blowoff pressure can be decreased. Thereby, the reinforcements, by which a strength of a third cable compartment 13, which is connected to the first duct 14, is maintained, can be reduced, so that a cost of the third cable compartment 13 can be lastly reduced.

A configuration, in which a plurality of cable compartments are connected by using the ducts, is adopted in the switchgear 100 according to Embodiment 3 of the present invention, whereby an ejection function of all cable compartments can be maintained without increasing the outer dimensions of the switchgear 100, and the AFLR class (configuration in which hot gas is not ejected to the other surface of upper and lower surfaces of switchgear), which is defined in the IEC standard (IEC 62271-200), can be realized.

In addition, in the scope of the present invention, it is possible that each of embodiments is freely combined, or each of embodiments is suitably modified or omitted.

INDUSTRIAL APPLICABILITY

The present invention can be applied in a field of a switching device, such as switchgear, and can be applied in a field of an electric power device, such as an electric power receiving and transforming facility.

What is claimed is:

1. Switchgear comprising: a high-voltage compartment which installs at least a switching device and a conductor, which is connected to the switching device, in a sealed vessel in which insulation gas is encapsulated; an operation mechanism compartment which installs an operation mechanism for operating the switching device; a control compartment which installs a control instrument for controlling the switching device; a base frame which supports the high-voltage compartment; and a plurality of cable compartments which respectively install a cable which is connected to the conductor, and are separated from each other; wherein a duct, by which inside portions of the plurality of cable compartments are linked each other, is provided; and a gas flow direction restriction device, by which high-pressure gas is flowed only in a predetermined direction in the duct when the high-pressure gas is generated at the inside of any of the cable compartments.

2. The switchgear as recited in claim 1, wherein the gas flow direction restriction device is composed of an arc check plate by which a connecting hole, which is provided at a connecting portion of the cable compartments and the duct, is opened or closed.

3. The switchgear as recited in claim 1, wherein the duct is arranged at a lower position of the high-voltage compartment.

4. The switchgear as recited in claim 1, wherein the duct includes shield plates which are arranged in a vertical direction with respect to a direction where the duct is extended.

5. The switchgear as recited in claim 4, wherein the plurality of shield plates are arranged via a predetermined interval in a direction where the duct is extended.

6. The switchgear as recited in claim 4, wherein the shield plates include at least one through hole.

7. The switchgear as recited in claim 1, wherein the duct includes shield plates which are arranged in a state where the shield plates are inclined with respect to a direction where the duct is extended.

8. The switchgear as recited in claim 7, wherein the plurality of shield plates are arranged via a predetermined interval in a direction where the duct is extended, and are alternately fixed to one side wall and the other side wall of the duct.

* * * * *